(12) United States Patent
Pollock et al.

(10) Patent No.: US 8,458,895 B2
(45) Date of Patent: Jun. 11, 2013

(54) ASSEMBLY FOR POSITIONING A ROTOR RETAINING RING

(75) Inventors: Cecil James Pollock, Ontario (CA); Ronald George Shillington, Ontario (CA); Ken Ivcar Salas Nobrega, Schenectady, NY (US); Jeremy Daniel Van Dam, West Coxsackie, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/249,750

(22) Filed: Sep. 30, 2011

(65) Prior Publication Data
US 2013/0081260 A1 Apr. 4, 2013

(51) Int. Cl.
*H02K 15/03* (2006.01)
(52) U.S. Cl.
CPC .................................. *H02K 15/03* (2013.01)
USPC .................................. 29/732; 29/234; 29/235
(58) Field of Classification Search
USPC ...................................... 29/450, 732, 234, 235
See application file for complete search history.

(56) References Cited

U.S. PATENT DOCUMENTS

| | | | |
|---|---|---|---|
| 4,617,726 A | 10/1986 | Denk | |
| 4,759,116 A | 7/1988 | Jones | |
| 5,046,231 A * | 9/1991 | Thompson | 29/426.6 |
| 5,486,730 A | 1/1996 | Ludwig et al. | |
| 5,537,923 A * | 7/1996 | Boor et al. | 101/375 |
| 5,801,470 A | 9/1998 | Johnson et al. | |
| 6,104,115 A | 8/2000 | Offringa et al. | |
| 6,195,869 B1 | 3/2001 | Pullen et al. | |
| 6,229,243 B1 | 5/2001 | Roesel, Jr. et al. | |
| 6,452,301 B1 | 9/2002 | Van Dine et al. | |
| 6,657,348 B2 | 12/2003 | Qin et al. | |
| 7,228,615 B2 | 6/2007 | Nilson | |
| 7,339,303 B2 | 3/2008 | Mitcham | |
| 7,514,827 B2 | 4/2009 | Hall | |
| 7,617,726 B2 * | 11/2009 | Douglas | 73/462 |
| 2004/0108781 A1 | 6/2004 | Razzell et al. | |
| 2008/0185923 A1 | 8/2008 | Noe | |
| 2010/0019610 A1 | 1/2010 | Saban et al. | |

FOREIGN PATENT DOCUMENTS

| | | |
|---|---|---|
| EP | 368930 B2 | 1/1999 |
| EP | 1475880 A2 | 11/2004 |
| EP | 1439626 B1 | 5/2008 |
| EP | 2091131 A1 | 8/2009 |
| GB | 2278504 A | 11/1994 |
| JP | 2000102227 A * | 4/2000 |

OTHER PUBLICATIONS

Machine Translation of JP 2000102227 A, obtained Feb. 6, 2012.*

* cited by examiner

*Primary Examiner* — Livius R Cazan
(74) *Attorney, Agent, or Firm* — Ann M. Agosti (57) ABSTRACT

An assembly for positioning a retaining ring includes a mandrel having an outer diameter smaller than an outer diameter of a rotor. The assembly also includes a seal assembly for sealing a circumferential retaining ring around the mandrel or the rotor, the seal assembly comprising a pair of seal plates situated around opposing ends of the retaining ring. Further, the assembly includes a hydraulic expansion device for providing a fluid pressure for hydraulically expanding the retaining ring until an inner diameter of the retaining ring is greater than the outer diameter of the rotor. Furthermore, the assembly includes a displacement device for providing axial movement of the seal assembly and the retaining ring.

10 Claims, 7 Drawing Sheets

ASSEMBLY FOR POSITIONING A ROTOR RETAINING RING

BACKGROUND

The invention relates generally to an assembly and a method for positioning a retaining ring and more particularly to an assembly and method for positioning a rotor retaining ring using a hydraulic mechanism.

Assembly of an electric machine often includes assembling a rotor that is provided with a radially compressive pre-stress by installing a pre-fabricated retaining ring with an interference fit over the rotor. The pre-stress of the rotor is used to contain centrifugal forces during high speed rotation. In order to achieve the pre-stress of the rotor, a cross-sectional inner diameter of the retaining ring is made smaller than an outer diameter of the rotor, and the retaining is expanded to achieve an interference fit over the rotor. The traditional process used to expand a retaining ring is the application of heat to cause thermal expansion. However, if the retaining ring is fabricated using a material that does not expand significantly or in desired amount and direction when subjected to temperature changes, or does not have adequately high temperature limits, then this may result in insufficient pre-stress of the rotor after the installation of the retaining ring. Materials ideally suited for use in many rotating assemblies, such as fiber reinforced composites, are known to have limited maximum acceptable temperatures and limited rates of thermal expansion. These materials therefore do not lend themselves to assembly by thermal expansion.

A second problem encountered in the use of thermal shrink fitting procedures is due to non-uniform expansion. A warped rotor can occur if the retaining ring expands in a manner that is not uniform because the temperatures everywhere in the part are not the same, or because the material thermal expansion characteristics everywhere in the part are not the same.

Accordingly, there is an ongoing need for efficient assembly and disassembly of a retaining ring with negligible frictional resistance and optimal use of high specific strength materials.

BRIEF DESCRIPTION

In accordance with an embodiment of the invention, an assembly for positioning a retaining ring is provided. The assembly includes: a mandrel having an outer diameter smaller than an outer diameter of a rotor; a seal assembly for sealing a circumferential retaining ring around the mandrel or the rotor, the seal assembly comprising a pair of seal plates situated around opposing ends of the retaining ring; a hydraulic expansion device for providing a fluid pressure for hydraulically expanding the retaining ring until an inner diameter of the retaining ring is greater than the outer diameter of the rotor; and a displacement device for providing axial movement of the seal assembly and the retaining ring.

In accordance with an embodiment of the invention, a method for installing a retaining ring on a rotor is provided. The method includes: situating a mandrel having an outer diameter smaller than an outer diameter of the rotor axially adjacent to the rotor; positioning a retaining ring circumferentially around the mandrel; disposing a pair of seal plates around opposing ends of the retaining ring; providing hydraulic pressure for expanding the retaining ring until an inner diameter of the retaining ring is greater than the outer diameter of the rotor and axially displacing the expanded retaining ring over the rotor; and releasing the hydraulic pressure.

In accordance with an embodiment of the invention, a method for removing a retaining ring from a rotor is provided. The method includes: situating a mandrel having an outer diameter smaller than an outer diameter of the rotor axially adjacent to the rotor; disposing a pair of seal plates around opposing ends of the retaining ring; providing hydraulic pressure for expanding the retaining ring until an inner diameter of the retaining ring is greater than the outer diameter of the rotor; axially displacing the expanded retaining ring over the mandrel and releasing the hydraulic pressure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
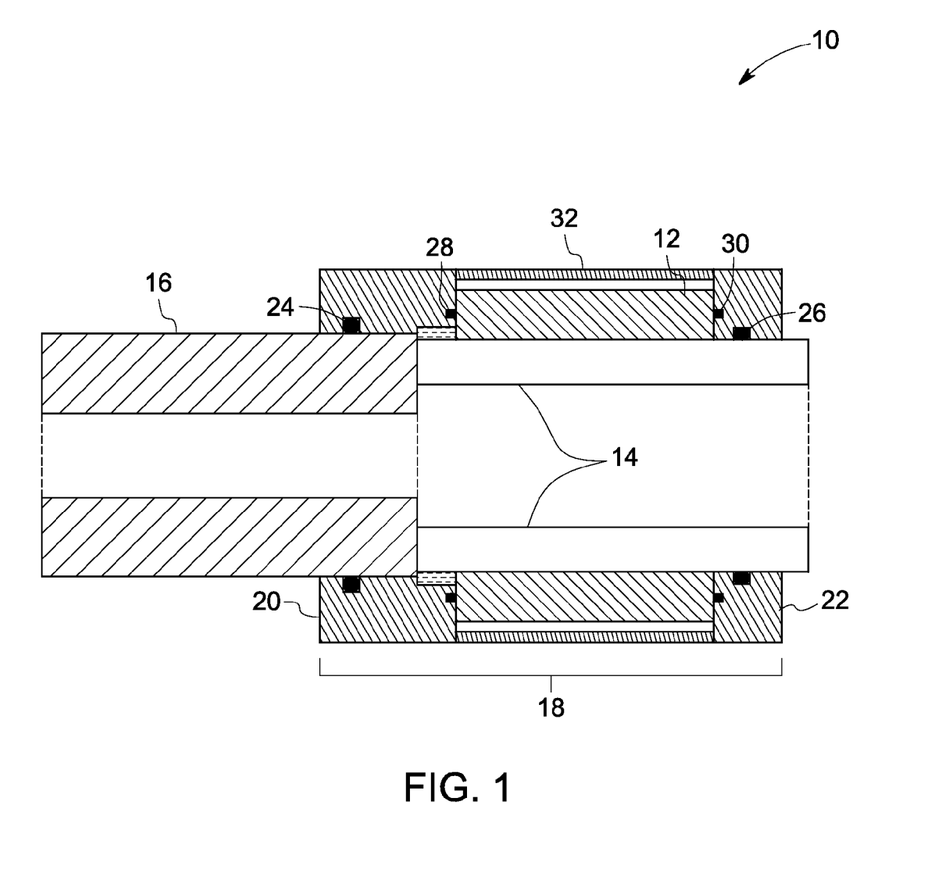
FIG. 1 is a cross-sectional view of an assembly for positioning a rotor retaining ring in accordance with an embodiment of the present invention.

FIG. 1 illustrates a cross-sectional view of an assembly 10 for positioning a retaining ring 12 prior to pressurization and displacement of the retaining ring 12 in accordance with an embodiment of the present invention. The assembly 10 may comprise a reusable assembly and disassembly apparatus for positioning the retaining ring 12 using a hydraulic-induced expansion mechanism. In one embodiment, the retaining ring 12 comprises a carbon fiber sleeve. Other examples of retaining materials include Inconel alloys. Thus, this assembly 10 may provide for an interference-fit assembly of a pre-fabricated retaining ring constructed of one or more materials with poor thermal expansion properties along at least one direction that prevents the use of thermal shrink fitting procedures. A mandrel 14 is located axially adjacent to a rotor 16. In one embodiment, the mandrel 14 comprises a cylindrical expansion mandrel of uniform diameter. In another embodiment, the mandrel may comprise a tapered mandrel. As shown in the embodiment, the retaining ring 12 is disposed circumferentially over the mandrel 14 before being radially expanded and axially displaced over the rotor 16 during assembly. Prior to assembly, the retaining ring 12 has a cross-sectional diameter that is smaller than the outer diameter of the rotor 16. In order to provide a compressive pre-stress on the rotor 16, the assembly 10 is configured to provide an interference-fit assembly of the retaining ring 12 over the rotor 16. The interference-fit assembly of the retaining ring 12 is achieved by providing a hydraulic pressure for expanding the retaining ring 12 axially displacing the retaining ring 12 to a desired position over the rotor 16, releasing the hydraulic pressure, and allowing the difference the inner diameter of the retaining ring and the outer diameter of the rotor to introduce the desired pre-stress. The use of hydraulic pressure to produce expansion in the retaining ring 12 may result in a stress level that approaches the strength limit of the material of the retaining ring 12, thereby enabling optimal material utilization. The assembly 10 further includes a seal assembly 18 for sealing the retaining ring 12. The seal assembly 18 includes a first seal plate 20 and a second seal plate 22. Both the first seal plate 20 and the second seal plate 22 are situated around opposing ends of the retaining ring 12.

The seal assembly 18 of FIG. 1 further includes multiple circumferential seals. Non-limiting examples of the circumferential seals may include elastomeric o-ring seals and lip seals. In one embodiment, a first circumferential seal 24 is situated on an interior diameter of the first seal plate 20 onto the surface of the rotor 16 and a second circumferential seal 26 is situated between the second seal plate 22 and the mandrel 14. Both the first circumferential seal 24 and the second circumferential seal 26 maintain hydraulic pressure while allowing axial position of the seal assembly 18 to be moved relative to the mandrel or rotor. As also shown in FIG. 1, a third circumferential seal 28 may be situated on an inboard side surface of the first seal plate 20 for sealing the retaining ring 12, and a fourth circumferential seal 30 may be situated on an inboard side surface of the second seal plate 22 for sealing the retaining ring 12. Both the third circumferential seal 28 and the fourth circumferential seal 30 maintain hydraulic pressure while allowing the radius of the retaining ring 12 to increase as it is expanded. The assembly 10 may optionally include a seal plate spacer 32 situated circumferentially around the retaining ring 12. In this embodiment, the first seal plate 20, the second seal plate 22, and the seal plate spacer 32 together are used for sealing and maintaining a hydraulic pressure during the assembly of the retaining ring 12.

Figure 2:
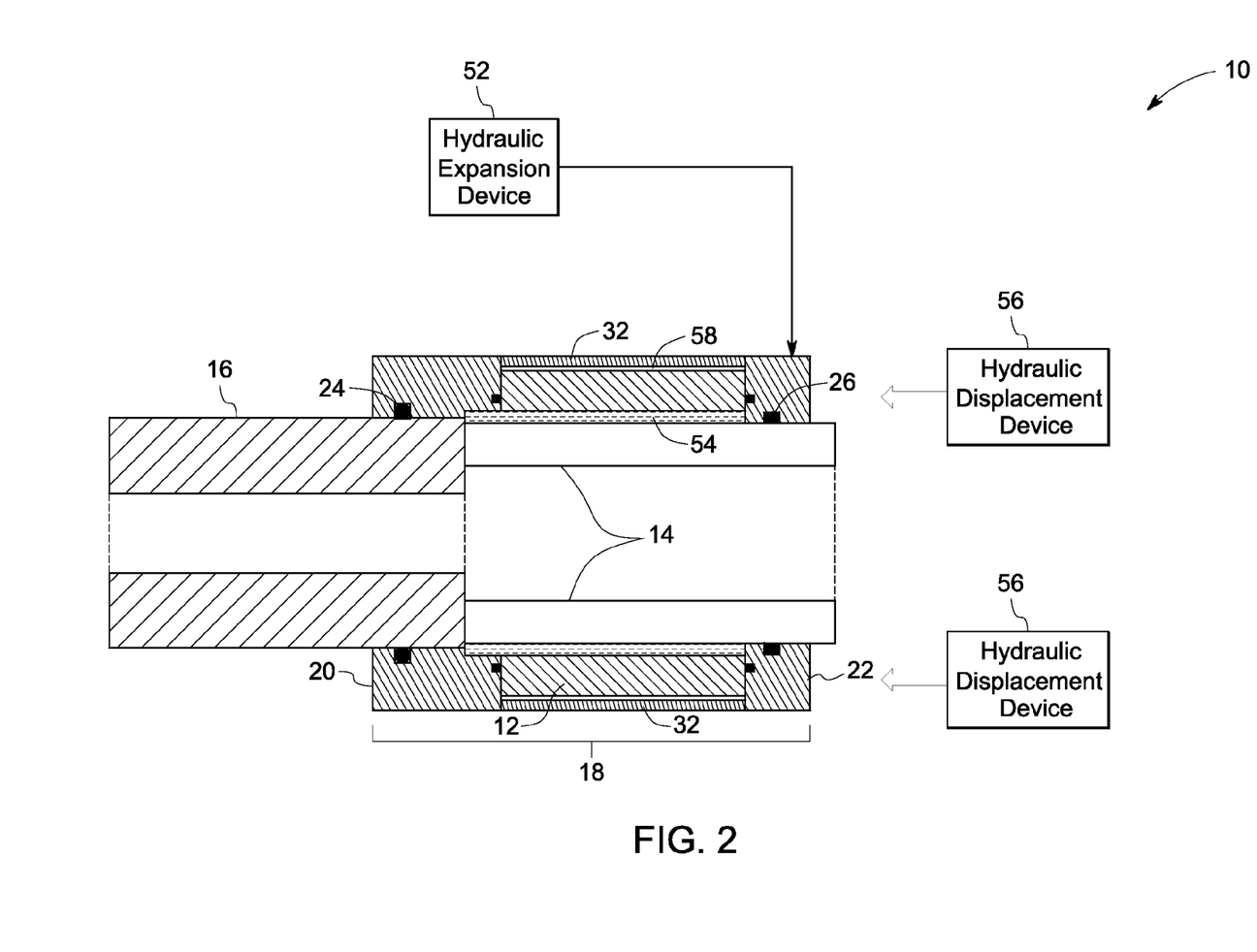
FIG. 2 is a cross-sectional view of the assembly of FIG. 1 during a hydraulic expansion stage of the positioning.

FIG. 2 shows a cross-sectional view of the assembly 10 of FIG. 1 during a hydraulic expansion stage of positioning of the retaining ring 12 in accordance with one embodiment of the present invention. A hydraulic expansion device 52 provides a fluid 54 for hydraulically expanding the retaining ring 12 until an inner diameter of the retaining ring is greater than the outer diameter of the rotor 16. One or both of the first seal plate 20 and the second seal plate 22 include at least one passageway through which the fluid 54 is provided by the hydraulic expansion device 52 such that the fluid 54 accumulates between the retaining ring 12 and the mandrel 14, thereby expanding the retaining ring 12 due to hydraulic pressure.

Figure 3:
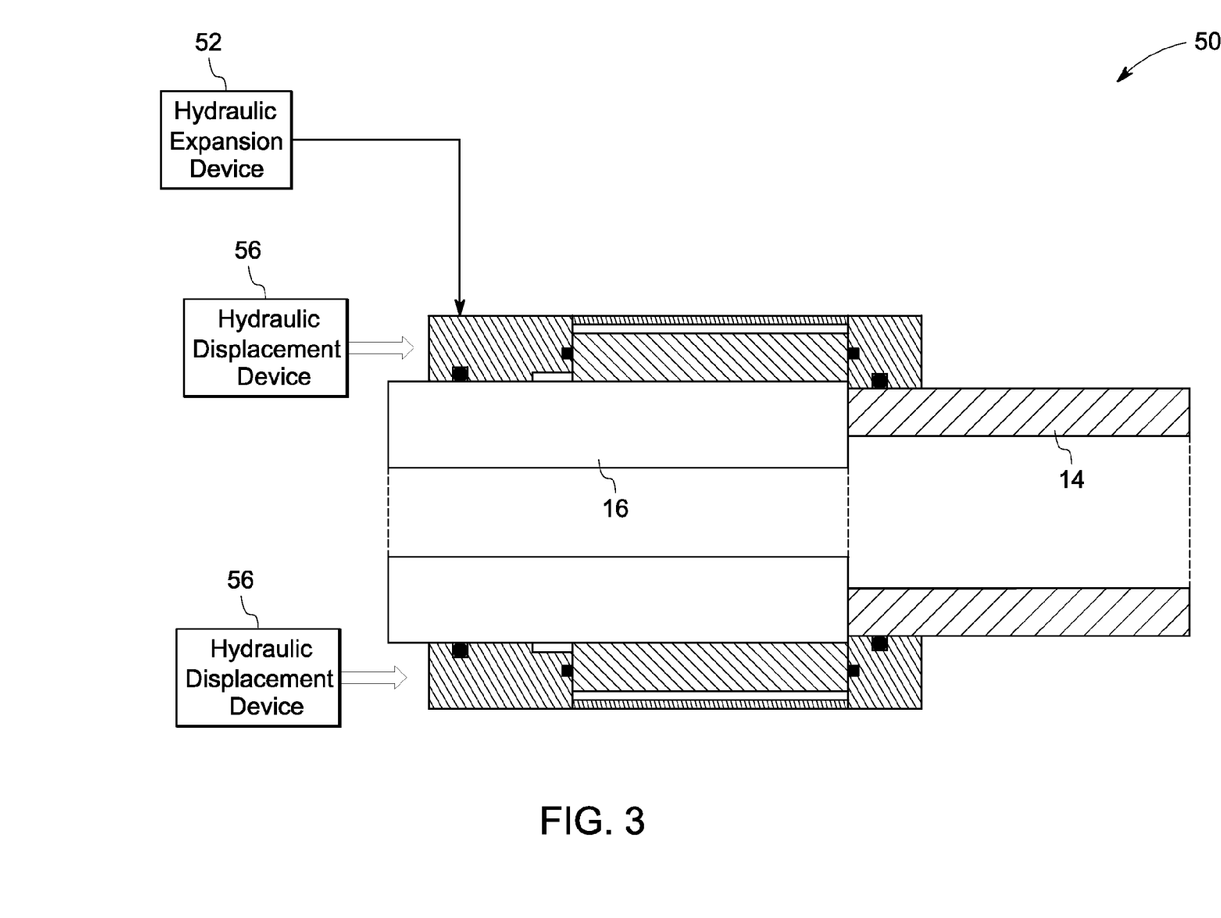
FIG. 3 is a cross-sectional view of an assembly for removing a retaining ring from a rotor in accordance with an embodiment of the present invention.
Figure 4:
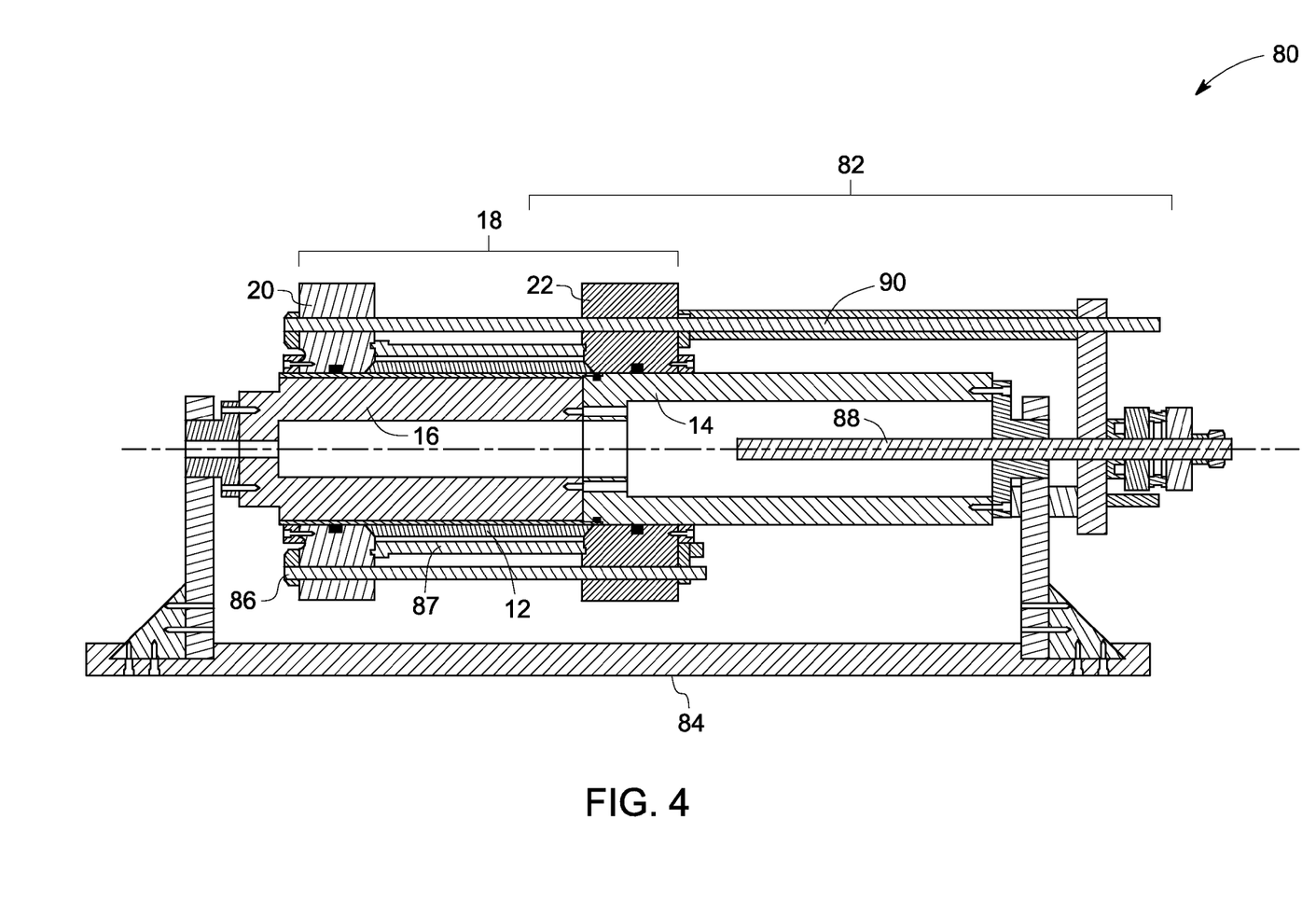
FIG. 4 is a cross-sectional view of an assembly for positioning a rotor retaining ring in accordance with another embodiment of the invention.

A displacement device is used for providing axial movement of the seal assembly 18 over the rotor 16 during assembly as shown in FIG. 2 or over the mandrel 14 during disassembly as shown in FIG. 3. In one embodiment, as shown in FIG. 2, the displacement device is a hydraulic displacement device 56 that provides a force to axially displace the seal assembly 18 along with the retaining ring 12. During this axial motion, both the first seal plate 20 and the second seal plate 22 provide for sealing of the hydraulic pressure at interfaces with their sliding surfaces and with edges of the retaining ring 12 through the use of the circumferential seals 24, 26. In one embodiment, the first seal plate 20 slides only over the rotor 16 and the second seal plate 22 slides only over the mandrel 14. When a straight mandrel is used, the first seal plate 20 and the second seal plate 22 are maintained at the same vertical location relative to each other (both lying along the same horizontal line), thus minimizing hydraulic leaks during axial movement of the seal assembly 18.

FIG. 3 shows a cross-sectional view of an assembly 50 for removing the retaining ring 12 from the rotor 16 in accordance with an embodiment of the present invention. The assembly 50 may be similar to the assembly 10 as described in FIG. 1 and FIG. 2 above except that the hydraulic displacement device 56 axially displaces the retaining ring 12 from the rotor 16 to the mandrel 14. In another embodiment, the displacement device includes a mechanical displacement device 82 as shown in FIG. 4.

FIG. 4 shows a cross-sectional view of an assembly 80 for positioning a retaining ring axially using the mechanical displacement device 82 in accordance with an embodiment of the invention. As shown, the mechanical displacement device 82 includes multiple axial bars 86 and a seal plate spacer 87 connecting the first seal plate 20 and the second seal plate 22. The seal plate spacer 87 is circumferentially disposed around the retaining ring 12 and maintains a required distance between the first seal plate 20 and the second seal plate 22. Further, at least two of the axial bars 86 are coupled to a threaded rod 88. In one embodiment, three axial bars 90 are longer than the other multiple axial bars 86 and have mechanical connection with the threaded rod 88. The threaded rod 88 is driven mechanically or using automated electrical bolts to axially displace the sealing assembly 18 along with the retaining ring 12. FIG. 4 additionally illustrates a support structure 84 (which is not shown but also may be used for the embodiments of FIGS. 1-3).

Figure 5:
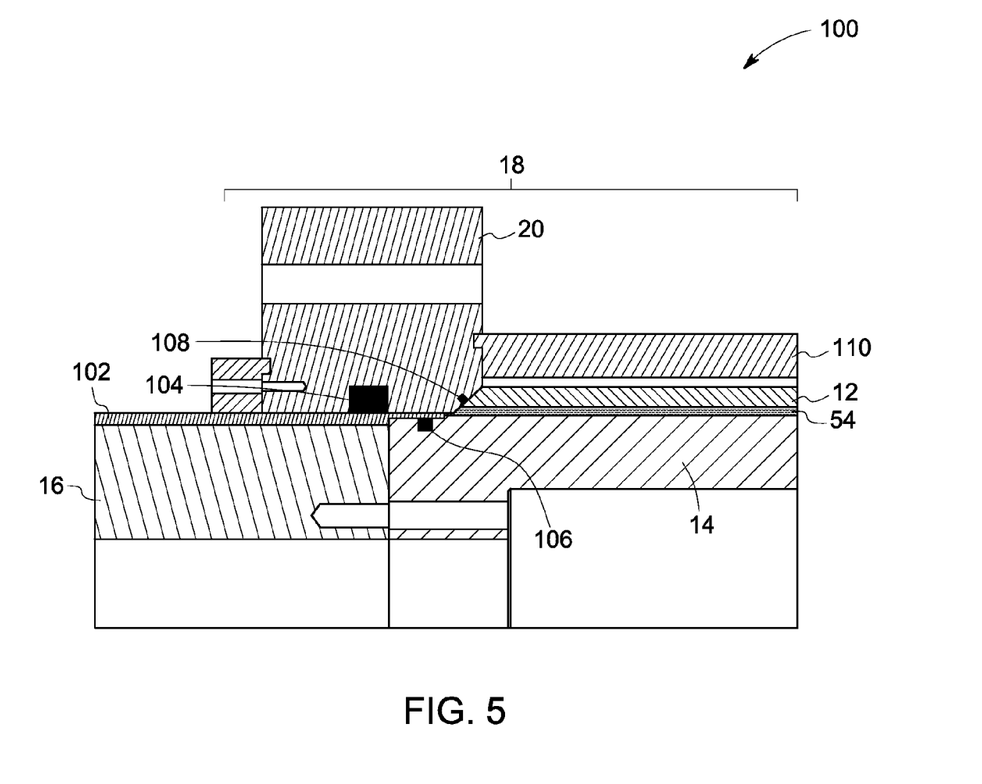
FIG. 5 is a partial cross-sectional view of a positioning assembly illustrating a liner sleeve on the rotor in accordance with another embodiment of the present invention.

FIG. 5 is a partial cross-sectional view of an assembly 100 for positioning the retaining ring 12 wherein the rotor comprises a liner sleeve 102. In this embodiment, the liner sleeve 102 is disposed on the core of rotor 16 such that the outer diameter of the combination of the liner sleeve 102 and the core of rotor 16 is greater than the outer diameter of the mandrel 14. In one embodiment, the liner sleeve 102 is heat shrunk around the core of the rotor. In a further embodiment, the liner sleeve 102 includes one or more layers of liner sleeves. The first seal plate 20 is configured to slide over the liner sleeve 102 during assembly and axial displacement of the retaining ring 12. In a more specific embodiment, the liner sleeve 102 also has a step-portion that extends beyond the interface of the rotor 16 and onto the mandrel 14, and the seal assembly 18 includes a first circumferential seal 104 situated between the interior diameter of the first seal plate and an outer surface of the liner sleeve 102 and a second circumferential seal 106 situated on an inner surface of the step portion of the liner sleeve 102 and within the mandrel 14. During axial movement of the seal assembly 18, the second circumferential seal 106 effectively seals the mandrel 14 to the liner sleeve 102, thereby preventing any ingress of the hydraulic fluid 54 under or over the liner sleeve 102. As shown in FIG. 5, the seal assembly 18 may additionally include a third circumferential seal 108 situated within the first seal plate 20 on a tapered interface of the retaining ring 12 and the first seal plate 20 to prevent the ingress of hydraulic fluid. In another embodiment, the seal assembly 18 may also include a fourth circumferential seal (not shown) situated within a second seal plate on an interface of the retaining ring 12 and the second seal plate to prevent the ingress of hydraulic fluid. Non-limiting examples of the first, second and third circumferential seals 104, 106, 108 may include o-ring seals or lip seals. FIG. 5 additionally illustrates seal plat spacer 110.

Figure 6:
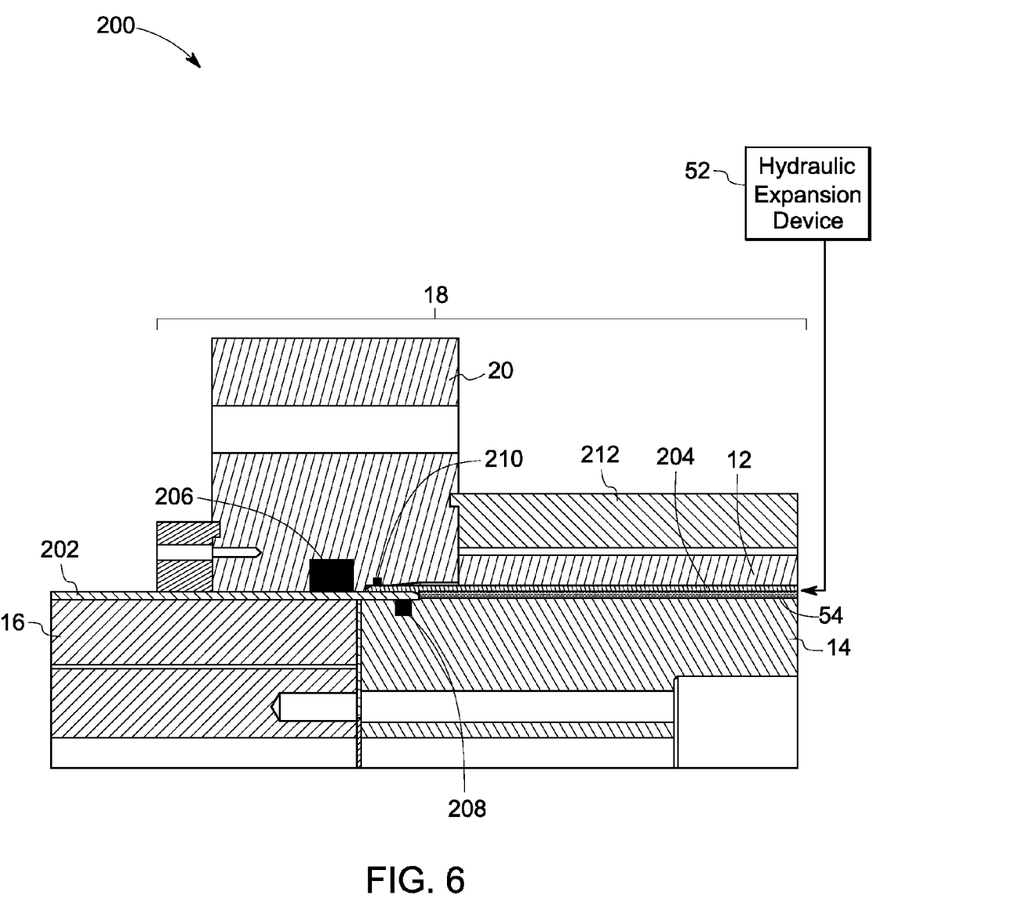
FIG. 6 is partial cross-sectional view of a positioning assembly illustrating a liner sleeve on the rotor and a liner sleeve within the retaining ring in accordance with yet another embodiment of the present invention.

FIG. 6 is a partial cross-sectional view of an assembly 200 for positioning the retaining ring 12 having a liner sleeve on the rotor and a liner sleeve within the retaining ring prior to assembly in accordance with an embodiment of the present invention. The first liner sleeve 202 is circumferentially situated directly around the rotor 16, and a second liner sleeve 204 is situated circumferentially over the mandrel 14. The second liner sleeve 204 may include one or more layers of liner sleeves. In a more specific embodiment, the hydraulic pressure is introduced to expand the gap between the second liner sleeve 204 and the mandrel 14, and the second liner sleeve 204 is displaced along with retaining ring 12 over the rotor 16.

The first and second liner sleeves minimize the possibility of hydraulic leaks by ensuring that the seal assembly 18 always rides on sealing surfaces of the liner sleeves and are not required to cross material or component interfaces. The liner sleeves further minimize the possibility of hydraulic leaks that may be caused by axial length changes of the retaining ring 12 during hydraulic expansion. In one embodiment, the first liner sleeve 202 extends onto the mandrel 14, and the second liner sleeve 204 overlaps the first liner sleeve 202. In the embodiment of FIG. 6, the seal assembly 18 includes a first circumferential seal 206 situated on the interior diameter of the first seal plate 20 and on an outer surface of the first liner sleeve 202. The first circumferential seal 206 slides on the first liner sleeve 202 during axial displacement of the seal assembly 18. The seal assembly 18 also includes a second circumferential seal 208 situated on an inner surface of the extended portion of the first liner sleeve 202 and positioned within the mandrel 14. The second circumferential seal 208 is stationary with respect to the first liner sleeve 202 during the axial displacement of the seal assembly 18 for installing the retaining ring 12. The second circumferential seal 208 prevents pressurized fluid ingress between the first liner sleeve and the rotor 16 or the mandrel 14. Further, the seal assembly 18 also includes a third circumferential seal 210 situated within the first seal plate 20 and on the outer surface of the second liner sleeve 204 when the retaining ring 12 is situated around the mandrel 14. The third circumferential seal 210 is stationary with respect to the second liner sleeve 204 during the axial displacement of the seal assembly 18 for installing the retaining ring 12. The third circumferential seal 210 prevents pressurized fluid egress between the second liner sleeve 204 and the seal plates 20, 22. It is to be noted that a circumferential seal similar to the third circumferential seal 210 is present at the other end of the second liner sleeve 204 within the seal plate 22 (not shown). In this embodiment, the hydraulic expansion device 52 may provide the hydraulic fluid 54 between second liner sleeve 204 and the mandrel 14 in order to expand the retaining ring 12. FIG. 6 additionally illustrates a seal plate spacer 212. Non-limiting examples of the first, second and third circumferential seals 206, 208, 210 may include o-ring seals or lip seals.

Figure 7:
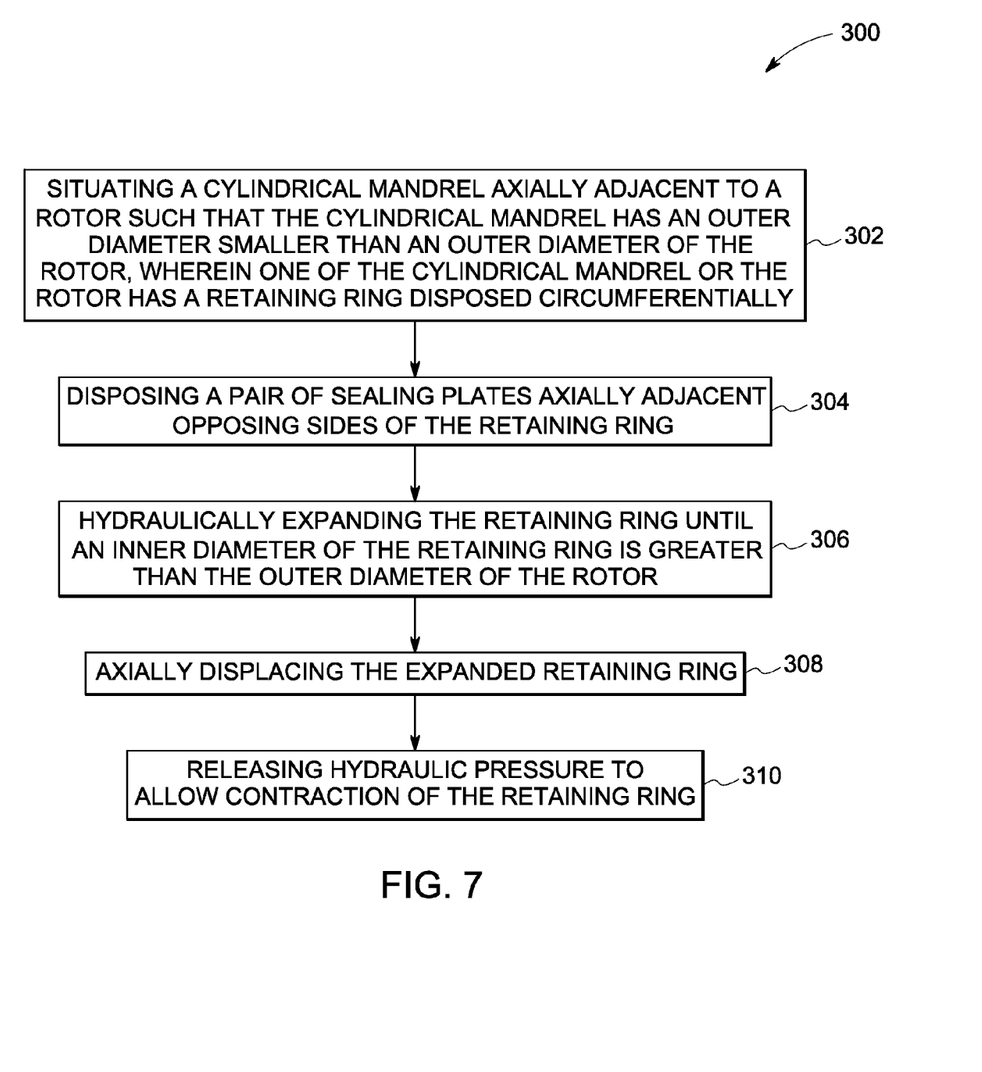
FIG. 7 is a flow chart for a method of positioning a retaining ring in accordance with an embodiment of the present invention.

FIG. 7 is a flow chart for a method of positioning a retaining ring in accordance with an embodiment of the present invention. At step 302, the method includes situating a mandrel axially adjacent to a rotor such that the mandrel has an outer diameter smaller than an outer diameter of the rotor. If the retaining ring is to be installed on the rotor, the retaining ring is situated over the mandrel at step 302. If the retaining ring is to be removed from the rotor, then the retaining ring is situated over the rotor at step 302. In either embodiment, either or both the rotor and the mandrel may have a liner sleeve positioned thereon. At step 304, the method includes disposing a pair of seal plates axially adjacent opposing ends of the retaining ring. Step 304 also includes disposing multiple circumferential seals with respect to the rotor, the mandrel, the endplate, and/or the optional sleeves for preventing fluid leakage. Further at step 306, the method includes hydraulically expanding the retaining ring until an inner diameter of the retaining ring is greater than the outer diameter of the rotor. This hydraulically expanding includes expanding a gap between the retaining ring and the underlying mandrel or rotor. At step 308, the method includes axially displacing the expanded retaining ring whether from the mandrel to the rotor or from the rotor toward the mandrel. The displacing of the retaining ring along with the sealing plates is carried out using a displacement device. Such a displacement device may include either a mechanical, eletro-mechanical or hydraulic displacement device. After axially displacing the retaining ring over a desired position, the method includes finally releasing the hydraulic pressure device to allow contraction of the retaining ring at step 310.

Advantageously, the present assembly and method provides for an interference-fit assembly of pre-fabricated retaining rings constructed of one or more materials with poor thermal expansion properties along at least one direction or low temperature limits that prevents the use of thermal shrink fitting procedures. Also, the present assembly and method enables the use of hydraulic pressure to produce a retaining ring expansion that results in a stress level that approaches the strength limit of the material thereby enabling optimal material utilization. Thus, the assembly and method enables the optimal use of high specific strength materials to produce thinner and lighter rotor retaining rings that will decrease the size and weight of the electric machine (motor or generator). This has been shown to increase power density by more than ⅓ compared to currently available technologies. Further, the present assembly and method enables the assembly and disassembly of the rotor retaining ring as the process can be implemented in a manner such that the ring is expanded over the rotor and axially displaced towards the mandrel or vice versa.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An assembly comprising:
   a rotor;
   a mandrel having an outer diameter smaller than an outer diameter of the rotor;
   a circumferential retaining ring;
   a liner sleeve situated circumferentially within the retaining ring;
   a seal assembly for sealing the retaining ring and liner sleeve around the mandrel or the rotor, the seal assembly comprising a pair of seal plates situated around opposing ends of the retaining ring;
   a hydraulic expansion device for providing a fluid pressure for hydraulically expanding the retaining ring and the liner sleeve until inner diameters of the retaining ring and liner sleeve are greater than the outer diameter of the rotor; and
   a displacement device for providing axial movement of the retaining ring and liner sleeve.

2. The assembly of claim 1, wherein the liner sleeve situated circumferentially within the retaining ring comprises a second liner sleeve, and wherein the rotor comprises a first liner sleeve situated circumferentially around the rotor.

3. The assembly of claim 2, wherein the second liner sleeve overlaps the first liner sleeve.

4. The assembly of claim 2 wherein the seal assembly further comprises a plurality of circumferential seals for preventing fluid leakage.

5. The assembly of claim 4, wherein a first one of the seal plates is situated around the rotor, a second one of the seal plates is situated around the mandrel, a first circumferential seal is situated between the first one of the seal plates and the rotor, and a second circumferential seal is situated between the second one of the seal plates and the mandrel.

6. The assembly of claim 5, wherein the first circumferential seal is configured to slide over the first liner sleeve during axial displacement of the seal assembly.

7. The assembly of claim 4, wherein a first one of the seal plates is situated partially around the rotor and partially around the mandrel, a second one of the seal plates is situated around the mandrel, a first circumferential seal is situated between the first one of the seal plates and the rotor, and a second circumferential seal is situated between the second one of the seal plates and the mandrel.

8. The assembly of claim 7, further comprising a third circumferential seal situated on an inboard side surface of the first one of the seal plates for sealing the retaining ring.

9. The assembly of claim 8, further comprising a fourth circumferential seal situated on an inboard side surface of the second one of the seal plates for sealing the retaining ring.

10. The assembly of claim 1, wherein the displacement device comprises one of a mechanical, electro-mechanical or hydraulic displacement device for axially displacing the seal assembly.

\* \* \* \* \*